United States Patent

Toda et al.

[11] Patent Number: 5,944,972
[45] Date of Patent: Aug. 31, 1999

[54] METHOD FOR PRODUCING DEIONIZED WATER

[75] Inventors: Hiroshi Toda, Ichihara; Tohru Hoshi, Yokohama, both of Japan; David Florian Tessier, Guelph, Canada

[73] Assignees: Asahi Glass Company Ltd., Tokyo, Japan; Glegg Water Conditioning, Incorporated, Guelph, Canada

[21] Appl. No.: 09/047,409

[22] Filed: Mar. 25, 1998

[30] Foreign Application Priority Data

Mar. 28, 1997 [JP] Japan ..................... 9-094907

[51] Int. Cl.$^6$ ............. B01D 61/48; C02F 1/469
[52] U.S. Cl. ............. 204/536; 204/551; 204/632; 204/647
[58] Field of Search ............. 204/536, 551, 204/632, 647

[56] References Cited

U.S. PATENT DOCUMENTS

| 4,465,573 | 8/1984 | O'Hare | 204/536 |
| 4,687,561 | 8/1987 | Kunz | 204/536 |

FOREIGN PATENT DOCUMENTS

| WO 83/03984 | 11/1983 | WIPO . |
| WO 97/34696 | 9/1997 | WIPO . |

OTHER PUBLICATIONS

Patent Abstracts of Japan, vol. 096, No. 010, Oct. 31, 1996, JP 08 150393, Jun. 11, 1996.

*Primary Examiner*—Arun S. Phasge
*Attorney, Agent, or Firm*—Oblon, Spivak, McClelland, Maier & Neustadt, P.C.

[57] ABSTRACT

A method for producing deionized water by self-regenerating type electrodialysis deionization, which comprises (i) using a deionized water-producing apparatus containing an electrodialyzer comprising cation exchange membranes and anion exchange membranes alternately arranged between an anode compartment provided with an anode and a cathode compartment provided with a cathode, demineralizing compartments compartmentalized with anion exchange membranes on the anode side and compartmentalized with cation exchange membranes on the cathode side, and concentrating compartments compartmentalized with cation exchange membranes on the anode side and compartmentalized with anion exchange membranes on the cathode side, the electrodialyzer having ion exchangers accommodated in the demineralizing compartments, and (ii) applying a voltage while supplying water to be treated to the demineralizing compartments to remove impurity ions in the water to be treated, wherein at least a part of the untreated water or already treated water is withdrawn to be added to a concentrating water for recycle, a flow amount of untreated water to be introduced into the demineralizing compartments being from 2 to 5.5 to a flow amount of a concentrating water to be introduced into the concentrating compartments, a linear velocity of untreated water in the demineralizing compartments being from 0.5 to 7.0 cm/sec, and a linear velocity of a concentrating water in the concentrating compartments being from 1.2 to 20 times to the linear velocity in the demineralizing compartments.

7 Claims, 1 Drawing Sheet

METHOD FOR PRODUCING DEIONIZED WATER

The present invention relates to a method for producing pure water or ultra-pure water by self-regenerating type electrodialysis deionization, which is used for pharmaceutical-manufacturing industries, semiconductor-manufacturing industries, food industries or boiler water and other laboratory facilities.

Heretofore, as a method for producing deionized water, it is common to obtain deionized water by passing water to be treated through a bed packed with an ion exchange resin so that impurity ions are removed as adsorbed on the ion exchange resin. Here, it is common to employ a method of regenerating the ion exchange resin having its ion-exchanging and adsorbing abilities lowered, by means of an acid or alkali. However, this method has problems that a troublesome operation is required and that a waste liquid of the acid or alkali used for the regeneration, is discharged.

Therefore, a method for producing deionized water which requires no such regeneration, is desired. From such a viewpoint, a self-regenerating type electrodialysis deionizing method has been recently developed and practically used. This method employs an electrodialyzer having anion exchange membranes and cation exchange membranes alternately arranged to form demineralizing compartments and having a mixture of anion-exchange resin and cation-exchange resin accommodated in the demineralizing compartments, and is designed to apply a voltage while supplying water to be treated to the demineralizing compartments and supplying concentrating water to concentrating compartments arranged alternately to the demineralizing compartments to carry out electrodialysis to produce deionized water.

Thus, a conventional method for producing deionized water by self-regenerating type electrodialysis deionization, employs a deionized water-producing apparatus containing an electrodialyzer comprising cation exchange membranes and anion exchange membranes alternately arranged between an anode compartment provided with an anode and a cathode compartment provided with a cathode, demineralizing compartments compartmentalized with anion exchange membranes on the anode side and compartmentalized with cation exchange membranes on the cathode side, and concentrating compartments compartmentalized with cation exchange membranes on the anode side and compartmentalized with anion exchange membranes on the cathode side, the electrodialyzer having an anion exchange resin and a cation exchange resin accommodated in the demineralizing compartments, and impurity ions in water to be treated are removed by applying a voltage while supplying the water to be treated to the demineralizing compartments and supplying a part of the water to be treated (untreated water) or already treated water as a concentrating water to the concentrating compartments.

According to this method, an ion exchanger is continuously regenerated, and it therefore has an advantage that regeneration by a chemical reagent such as an acid or alkali is not necessary. However, since this method generally requires a high voltage to be applied, it raises a problem of high power cost or high accessory rectifier cost. Accordingly, it is an important subject to lower a voltage to be applied. An amount of waste water to be disposed is largely reduced in comparison with the case of using a bed packed with an ion exchange resin, but from a viewpoint of recent environmental problems, it is required to further reduce an amount of waste water such as a concentrating water or the like to be disposed. Thus, it is strongly demanded to positively improve a rate of using the starting water efficiently.

Among the above mentioned problems, to reduce a voltage means to lower an electric resistance in demineralizing compartments and/or concentrating compartments, but since an anion exchange resin and a cation exchange resin accommodated in the demineralizing compartments are electroconductive materials, it is considered that an important factor to lower the electric resistance resides in the concentrating compartments.

As a method for lowering the electric resistance in the concentrating compartments, it is proposed to minimize a thickness of the concentrating compartments. However, since an electrodialyzer generally comprises plural pairs of concentrating compartments, a flow amount distribution becomes extremely different with regard to water to be flown between each pair when the thickness of a concentrating compartment is made extremely small. Further, there is a fear of causing a local voltage rise. Also, from a viewpoint of accuracy for designing a concentrating compartment, there is a restriction, and a practically allowable thickness of the concentrating compartment is restricted.

On the other hand, when a water-flowing system on the concentrating compartment is not a recycling system, a practical flow amount of water to be treated in a conventional electrodialyzer is from 3 to 5 to a flow amount of a concentrating water, and when the water to be treated is demineralized to pure water, impurity ions in the concentrating water are concentrated to 4–6 times. However, by this degree of concentration rate, a satisfactory reduction in electric resistance can not be achieved even when a thickness of the compartment frame is made extremely small. On the contrary, a problem of a water flow distribution is raised, and a voltage to be applied may have to be raised.

As another method for lowering the electric resistance in the concentrating compartments, it is proposed to elevate a concentration of a concentrating water. This method can be considered to be effected by reducing a flow amount of the concentrating water. That is, a concentration rate is elevated by reducing a flow amount of the concentrating water, whereby an electroconductivity is raised to reduce a voltage to be applied. However, in order to prevent occurrence of the ion concentration gradient in a concentrating compartment and also to prevent scale precipitation due to the presence of hardness components in water such as Ca ion, Mg ion and the like, it is necessary to cause a turbulent flow by flowing a concentrating water in an amount larger than a certain degree of amount. On the other hand, to reduce a flow amount of the concentrating water as mentioned above, means to reduce or to prohibit occurrence of a required turbulent flow.

It is therefore proposed to raise a flow amount ratio (water to be treated/concentrating water ratio) of water to be treated and a concentrating water and to raise a linear velocity of water in the concentrating compartment. However, when a water flow system on the concentrating compartment side is not a recycling system, the above mentioned problem concerning a frame thickness is raised, and an amount of water to be treated or already treated water to be supplied as a concentrating water is increased, thereby reducing efficiency of water to be treated and increasing an amount of waste water to be disposed.

Further, as other method to reduce the electric resistance in the concentrating compartment, it is proposed to pack an ion exchange resin also into the concentrating compartment. However, since the concentrating compartment originally has a small thickness, it is difficult to pack an ion exchange resin therein, and therefore this method is not realistic. Also, even when the compartment frame is made so thick as to be able to pack the ion exchange resin, pressure loss becomes high, and it becomes difficult to achieve a good pressure balance between the concentrating compartment and the demineralizing compartment. Further, in proportion to the thickness of the compartment frame, the size of the electrodialyzer becomes large. As mentioned above, there are some methods to lower the electric resistance in the concentrating compartment, but when the water flow system on the concentrating compartment side is not a recycling system, the above mentioned various disadvantages are raised, and a basic solution could not be achieved up to now.

The present invention has been made in order to solve the above mentioned various problems. Thus, an object of the present invention is to provide a method for producing deionized water by self-regenerating type electrodialysis deionization, which comprises applying accurately controlled operation conditions to an apparatus for producing deionized water, comprising an electrodialyzer having cation exchange membranes and anion exchange membranes alternately arranged between a cathode and an anode to form demineralizing compartments and concentrating compartments and having ion exchangers accommodated in the demineralizing compartments, thereby solving the above mentioned conventional problems.

That is, the present invention provides a method for producing deionized water by self-regenerating type electrodialysis deionization, which comprises (i) using a deionized water-producing apparatus containing an electrodialyzer comprising cation exchange membranes and anion exchange membranes alternately arranged between an anode compartment provided with an anode and a cathode compartment provided with a cathode, demineralizing compartments compartmentalized with anion exchange membranes on the anode side and compartmentalized with cation exchange membranes on the cathode side, and concentrating compartments compartmentalized with cation exchange membranes on the anode side and compartmentalized with anion exchange membranes on the cathode side, the electrodialyzer having ion exchangers accommodated in the demineralizing compartments, and (ii) applying a voltage while supplying water to be treated to the demineralizing compartments to remove impurity ions in the water to be treated, wherein at least a part of the untreated water or already treated water is withdrawn to be added to a concentrating water for recycle, a ratio of a flow amount of untreated water to be introduced into the demineralizing compartments/a flow amount of a concentrating water to be introduced into the concentrating compartments being 2–5.5/1, a linear velocity of untreated water in the demineralizing compartments being 0.5–7.0 cm/sec, and a linear velocity of a concentrating water in the concentrating compartments being 1.2–20 times to the linear velocity in the demineralizing compartments.

The present invention employs a deionized water-producing apparatus containing an electrodialyzer comprising cation exchange membranes and anion exchange membranes alternately arranged between an anode compartment provided with an anode and a cathode compartment provided with a cathode, demineralizing compartments compartmentalized with anion exchange membranes on the anode side and compartmentalized with cation exchange membranes on the cathode side, and concentrating compartments compartmentalized with cation exchange membranes on the anode side and compartmentalized with anion exchange membranes on the cathode side, the electrodialyzer having ion exchangers accommodated in the demineralizing compartments. A concentrating water to be introduced into the concentrating compartments is preferably reused by recycling to a tank other than the concentrating compartments, and a part of untreated water or already treated water is added in a predetermined amount to the recycling system to maintain a concentration of concentrating water constant. The amount of the untreated water or treated water thus added is not specially limited, but is preferably in the range of from 0.2 to 9.5 wt % to the total water to be treated, for practical use.

In this invention, a term "concentrating water" means a water to be passed through a concentrating compartment, and a term "untreated water" means a water to be introduced into a deionizing compartment.

BRIEF DESCRIPTION OF DRAWING

In FIG. 1, A represents anion exchange membranes and K represents cation exchange membranes. As illustrated in the Figure, these anion exchange membranes A and cation exchange membranes K are arranged in predetermined distances by means of demineralizing compartment frames $D_1, D_2, D_3 \ldots D_n$ and concentrating compartment frames $C_1, C_2, C_3 \ldots C_{n+1}$ in an electrodialyzer 1, thereby forming an anode compartment 2, concentrating compartments $S_1, S_2 \ldots S_{n+1}$, demineralizing compartments $R_1, R_2 \ldots R_n$ and a cathode compartment 3. In the demineralizing compartments $R_1, R_2 \ldots R_n$, anion and cation exchange resin are accommodated and packed. In the concentrating compartments, spacers of mesh-like structures are inserted.

In FIG. 1, numeral 4 represents an anode and numeral 5 represents a cathode, and a predetermined amount of voltage is applied between the two electrodes during operation. Water to be treated is introduced through a conduit 6 into demineralizing compartments $R_1, R_2 \ldots R_n$ and anion components in the water to be treated are permeated and transferred through anion exchange membranes A to concentrating compartments on the anode side. On the other hand, cation components in the water to be treated in the demineralizing compartments are permeated and transferred through cation exchange membranes K to concentrating compartments on the cathode side. In this manner, the water to be treated is deionized, and discharged through a conduit 7 to be utilized. Further, a concentrating water is introduced through a conduit 9 into each concentrating compartment $S_1, S_2 \ldots S_{n+1}$, wherein the above mentioned permeated and transferred anions and cations are gathered and recycled through a conduit 8. FIG. 1 illustrates the case in which the flow direction of the water to be treated and the flow direction of the concentrating water are co-current each other, but as a matter of fact, they may be counter-current.

In FIG. 1, a part of withdrawn from the concentrating water is withdrawn from the conduit 9 to be introduced into the anode compartment 2 and the cathode compartment 3. The water introduced into the anode compartment 2 is disposed through conduit 12. The water introduced into the cathode compartment 3 is disposed through conduit 13.

Figure 1:
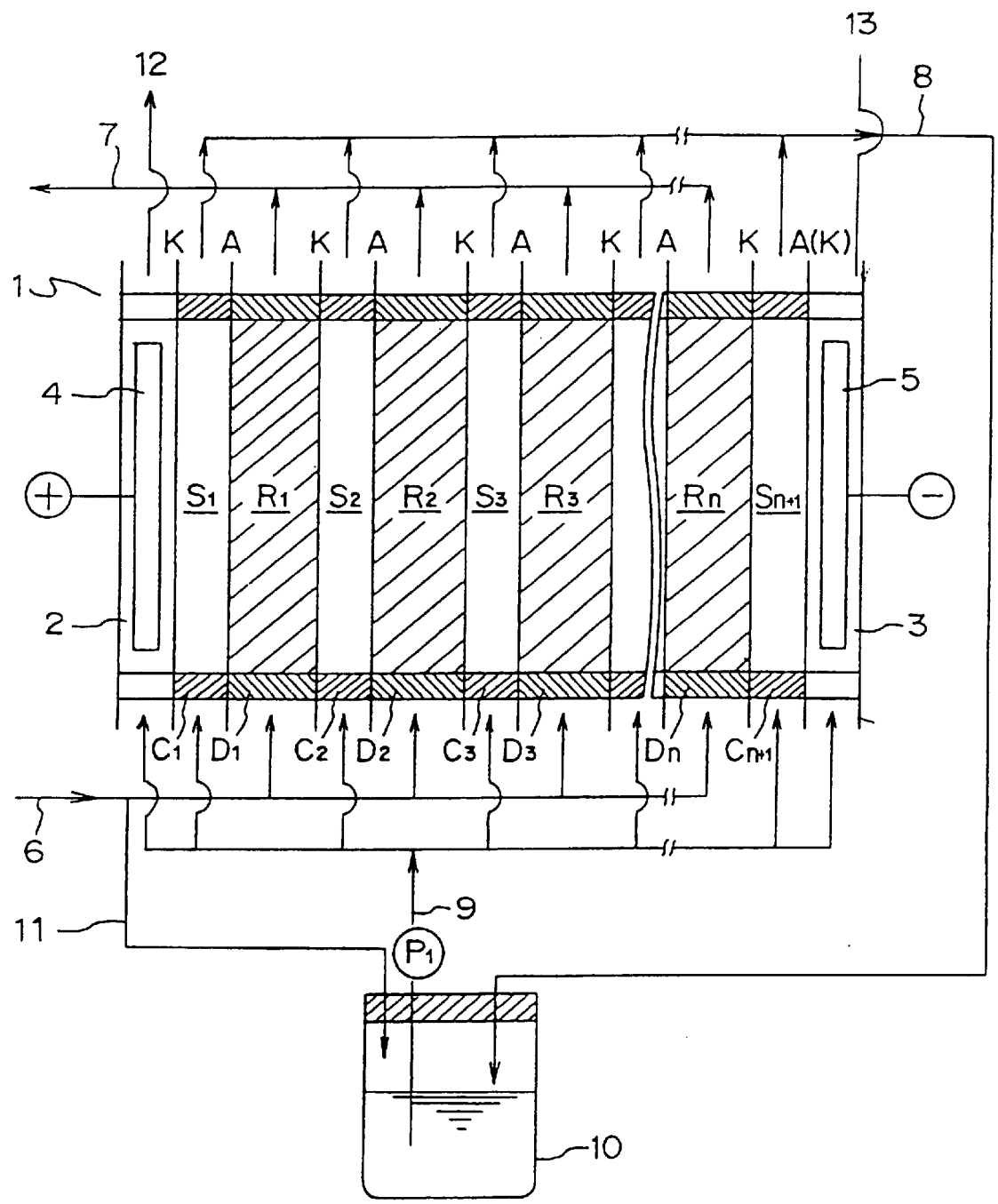
FIG. 1 illustrates an embodiment of the self-regenerating type electrodialysis deionization apparatus usable in the present invention.

In each demineralizing compartment $R_1, R_2 \ldots R_n$, cations in the water to be treated trapped by a cation exchanger are driven by an electric field through a cation exchanger in contact with the cation exchanger trapping cations into a cation exchange membrane, and are permeated through the membranes and transferred to each concentrating compartment $S_1, S_2 \ldots S_{n+1}$. In the same manner as above, anions in the water to be treated trapped by an anion exchanger are driven through an anion exchanger and an anion exchange membrane in contact therewith and are transferred to each concentrating compartment $S_1, S_2 \ldots S_{n+1}$.

As mentioned above, in the present invention, a concentrating water withdrawn from each concentrating compartment is preferably reused for recycling between each concentrating compartment and a tank other than the concentrating compartment, and a part of untreated water or already treated water is added in a predetermined amount to the recycling system to maintain a concentration constant. In FIG. 1, 10 represents a tank, a concentrating water withdrawn from each concentrating compartment $S_1, S_2 \ldots S_{n+1}$ is introduced through a conduit 8 into a tank 10, and is reused for recycling through a conduit 9. P1 represents a pump for recycling. In the present invention, flow amounts of water to be treated and concentrating water are adjusted to be a predetermined ratio by controlling an amount of water to be treated newly added to a concentrating water recycle system, and a required amount of water to be treated is separated from a conduit 6 by a separative conduit 11, and is introduced into a tank 10 through a control valve (not shown), and is then added to a recycled concentrating water. In the present invention, a treated water may be used in place of the water to be treated (untreated water), but in such a case, the treated water is separated from a treated water conduit 7.

In the present invention, a flow amount of the water to be treated is adjusted to be from 2 to 5.5 to a flow amount of a concentrating water. If the flow amount of the water to be treated is less than 2 times as small as the flow amount of the concentrating water, the concentrating water does not provide a satisfactory electroconductivity when recycled for reuse. On the other hand, if the flow amount of the water to be treated is more than 5.5 times as large as the flow amount of the concentrating water, the efficiency of deionization is lowered and consequently the water quality of the deionized water thus obtained is lowered. Particularly, it is preferable to use the water to be treated in a flow amount of from 3 to 5 times as large as a flow amount of a concentrating water.

However, even when the above mentioned flow amount ratio of the water to be treated to a concentrating water is satisfied, a satisfactory result can not be obtained unless linear velocities of respective flowing waters in a demineralizing compartment and in a concentrating compartment are adjusted so as to satisfy predetermined conditions. For the purpose of demineralization, it is usual to conduct operation under an excessive pressure condition on the demineralizing compartment side so that the water to be treated may not be contaminated with a concentrating water even if an internal leakage occurs. If the linear velocity of the water to be treated is less than 0.5 cm/sec, it becomes difficult to obtain an appropriate pressure loss and an absolute pressure in the concentrating compartment becomes higher. On the contrary, if the linear velocity of the water to be treated is higher than 7.0 cm/sec, a pressure loss becomes too large, and a contact time between the water and the resin becomes shorter, whereby the efficiency of deionization is lowered and the water quality of the deionized water thus obtained tends to be lowered. Thus, the linear velocity of the water to be treated in demineralizing compartments is adjusted to be in the range of from 0.5 to 7.0 cm/sec, preferably from 1.0 to 5.5 cm/sec.

On the other hand, it is necessary to adjust the linear velocity of a concentrating water in a concentrating compartment at least 1.2 times higher than the linear velocity of water to be treated in a demineralizing compartment. In the concentrating compartment, it is usual to use such a structure as to prevent deformation and to secure a flow path, preferably a mesh-like structure, and this structure provides a pressure loss smaller than an ion exchange packing material in a demineralizing compartment. Therefore, if the linear velocity of a flowing water in a concentrating compartment is less than 1.2 times as small as the linear velocity of a flowing water in a demineralizing compartment, the pressure in the concentrating compartment becomes too small to that in the demineralizing compartment, and an ion exchange membrane is intruded into openings of such a structure as a mesh-like structure, whereby it becomes difficult to secure an appropriate proper flow amount.

Also, such a low linear velocity hardly causes an effective turbulent flow in a concentrating compartment, whereby a scale due to the presence of hardness components in water such as Ca ion and Mg ion is likely to be precipitated. On the other hand, if the linear velocity of a flowing water in a concentrating compartment is more than 20 times as high as the linear velocity of a flowing water in a demineralizing compartment, the demineralizing compartment can not be maintained under an excessive pressure condition higher than the concentrating compartment, and consequently the water quality of treated water becomes lowered. It is therefore necessary to adjust the linear velocity of a concentrating water in a concentrating compartment in the range of from 1.2 to 20 times, preferably from 1.5 to 15 times as high as the linear velocity of a flowing water in a demineralizing compartment.

In the present invention, in order to provide the above mentioned specific flow ratio and linear velocity, it is preferable to adjust a thickness of a demineralizing compartment in the range of from 0.3 to 30 cm and also to adjust a thickness of a concentrating compartment in the range of from 0.01 to 3.7 cm. Thus, if the thickness of a demineralizing compartment is smaller than 0.3 cm, the number of constituting parts becomes large to a predetermined load amount, which leads to a high cost. On the other hand, if the thickness of a demineralizing compartment exceeds 30 cm, a possibility of bringing a cation exchange resin and an anion exchange resin in continuous contact with each other between a cation exchange membrane and an anion exchange membrane constituting a demineralizing compartment becomes extremely low, and consequently, the efficiency of deionization becomes unfavorably low. On the other hand, if the thickness of a concentrating compartment is less than 0.01 cm, it becomes very difficult to prevent water from dispersing into each compartment frame, and on the contrary, if the thickness of a concentrating compartment exceeds 3.7 cm, an electrodialyzer becomes too large in size, which leads to a high cost. Particularly, the thickness of a demineralizing compartment is preferably from 0.7 to 15 cm, and the thickness of a concentrating compartment is preferably from 0.04 to 2 cm.

Also, it is possible to raise a concentration of a concentrating water by adding a salt or an acid to a concentrating water to be recycled and reused. The addition of a salt or an acid to the recycling system is helpful for optionally controlling a concentration and a pH value of a concentrating water in combination with the addition amount of untreated water or treated water supplied separately, whereby a voltage to be applied can be reduced and precipitation of a salt of hard water components in a concentrating compartment, particularly Ca salt, can be effectively prevented. For a practical operation, an electroconductivity of a concentrating water is preferably in the range of from 50 to 3000 μS/cm when considering unit requirements of water to be treated or treated water and salt or acid.

EXAMPLES

Hereinafter, the present invention is further illustrated by the following Examples, but it should be noted that the present invention is not limited to these Examples. In the Examples, a self-regenerating type electrodialyzer apparatus as shown in FIG. 1 was used, and an example of flowing a water to be treated and a concentrating water as upward co-current was employed. In Comparative Example 1, a flowing water on the concentrating compartment was not recycled but was made one path. In Comparative Example 1, a conduit 8 was not connected to the tank 10, and an embodiment of introducing a water to be treated through a conduit 9 and disposing through a conduit 8 was employed as a concentrating water. Further, in Comparative Example 2, the thickness of a concentrating compartment was made 0.38 cm unlike other Examples, and in Example 2 and in Comparative Example 2, 1 ppm of $Mg^{2+}$ ion was added as a promoting factor of scale precipitation in a concentrating compartment.

Examples 1 to 2 and Comparative Examples 1 to 2

An electrodialyzer (effective area 507 cm² [width (=compartment frame width) 13 cm, length (=demineralizing compartment length) 39 cm]×3 pairs) comprising a filter press type dialyzer (a polypropylene-made net is inserted into a concentrating compartment) having a cation exchange membrane (strong acid type heterogeneous membrane, thickness 500 μm, ion exchange capacity 4.5 meq/g-dry resin) and an anion exchange membrane (strong base type heterogeneous membrane, thickness 500 μm, ion exchange capacity 3.5 meq/g-dry resin) arranged and fixed by way of a demineralizing compartment frame (made of polypropylene) and a concentrating compartment frame (made of polypropylene) was formed. In Examples 1 to 2 and Comparative Example 1, the thickness of a demineralizing compartment was made 0.8 cm, and the thickness of a concentrating compartment was made 0.19 cm, but in Comparative Example 2, the thickness of a concentrating compartment was made 0.38 cm.

A demineralizing compartment was packed with a sheet-like molded product of a mixture of a cation exchange resin, an anion exchange resin and a binder in dry state, and a spacer made of a synthetic resin was placed in a concentrating compartment to secure a flowing path. The above two ion exchange resins employed were an acid (sulfonic acid) type (H type) cation exchange resin (tradename: Diaion SK-1B manufactured by Mitsubishi Chemical Corporation) having a particle diameter of 400 to 600 μm and an ion exchange capacity of 4.5 meq/g dry resin and a quaternary ammonium salt type (OH type) anion exchange resin (tradename: Diaion SA-10A manufactured by Mitsubishi Chemical Corporation) having a particle diameter of 400 to 600 μm and an ion exchange capacity of 3.5 meq/g dry resin, and an ion exchange capacity ratio of the two resins was made 50/50.

By using this electrodialyzer, a test for producing deionized water was carried out in the following manner. Industrial water was filtrated, and treated by a reverse osmosis apparatus to prepare "water to be treated". The industrial water employed and the water to be treated thus prepared were measured with regard to electroconductivity, pH value and composition of constituents, and the results are shown in the following Table 1. The water to be treated was introduced upward as a water to be treated and a concentrating water, and was regenerated under predetermined electric regeneration conditions, and operation was carried out under flow amount conditions as shown in the following Table 2.

The voltage and D.C. electric current conditions employed during this operation are shown in the following Table 3. Applied voltages shown in Table 3 are voltages required to obtain a satisfactory deionized water-having a specific resistance value of at least 10 M Ω.cm. In Comparative Example 1, a flowing water on the concentrating compartment side was not recycled, and was made one path. In each of Examples 1 to 2 and Comparative Examples 1 to 2, operation was carried out continuously for 750 hours under conditions as shown in the following Tables 2 and 3. After finishing the operation, the electrodialyzer used was disassembled to check occurrence of scale precipitation on the concentrating compartment side. These results are shown in the following Tables 2 and 3.

TABLE 1

|  | Electro-conductivity (μS/cm) | pH | Na (μg/L) | Ca (μg/L) | Mg (μg/L) |
|---|---|---|---|---|---|
| Industrial water | 309 | 6.5 | 15600 | 29900 | 9200 |
| Water to be treated | 6.6 | 5.9 | 1300 | 61 | 22 |

TABLE 2

|  | Example 1 | Example 2 | Comparative Example 1 | Comparative Example 2 |
|---|---|---|---|---|
| Flow amount of water to be treated (L/H/compartment) | 90 | 90 | 90 | 90 |
| Linear velocity of water to be treated (cm/sec) | 2.4 | 2.4 | 2.4 | 2.4 |
| Recycled flow amount of concentrating water (L/H/compartment) | 30 | 30 | 30 | 30 |
| Linear velocity of concentrating water (cm/sec) | 3.4 | 3.4 | 3.4 | 1.7 |
| Flow amount ratio (water to be treated/concentrating water) | 3/1 | 3/1 | 3/1 | 3/1 |
| Mg concentration (ppm as Mg) | 0 | 1 | 0 | 1 |
| Utilization ratio of starting water (%) | 95 | 95 | 75 | 95 |

TABLE 3

|  | Electro-conductivity of concentrating water (μS/cm) | Applied voltage (V) | D.C. electric current (A) | Presence of absence of scales after 750 hours |
|---|---|---|---|---|
| Example 1 | 152 | 45 | 2.0 | absence |
| Example 2 | 302 | 35 | 2.0 | absence |
| Comparative Example 1 | 25 | 100 | 2.0 | absence |
| Comparative Example 2 | 298 | 60 | 2.0 | presence |

As evident from Tables 2 and 3, in Comparative Example 1 wherein a flowing water on the concentrating compartment side was made one path, the electroconductivity of concentrating water was extremely low (i.e. low concentration) and the applied voltage is high, as compared with Example 1 employing the same flow amount ratio and flowing velocity conditions. Also, the rate of using starting water in Comparative Example 1 was lower by 20% than in Example 1. Further, when comparing Example 2 and Comparative Example 2, both of which contain 1 ppm of $Mg^{2+}$ ion as a promoting factor of scale precipitation in a concentrating compartment, a scale did not precipitate in Example 2, whereas a scale clearly precipitated in Comparative Example 2. It is evident from this fact that a scale of hard water components precipitates when a linear velocity on the concentrating compartment side is low even if a flow amount ratio of water to be treated and concentrating water is equivalent to each other.

According to the present invention, by controlling a flow amount of water to be treated or treated water newly added to the concentrating water recycle system to make a flow amount ratio of the water to be treated and the concentrating water in the specific predetermined range and by adjusting each linear velocity in the specific predetermined range, a high electroconductivity can be secured in a concentrating compartment, and also by causing an effective turbulent flow by a high linear velocity, precipitation of a scale in a concentrating compartment can be prevented while being operable under a low voltage. By this manner, it is possible to reduce electric power unit requirements. Further, since a high rate of using starting water can be easily achieved, an amount of water to be disposed outside the system can be reduced, whereby an operation cost can be reduced and a cost per unit production amount of deionized water can be further reduced.

What is claimed is:

1. A method for producing deionized water by self-regenerating type electrodialysis deionization, which comprises (i) using a deionized water-producing apparatus containing an electrodialyzer comprising cation exchange membranes and anion exchange membranes alternately arranged between an anode compartment provided with an anode and a cathode compartment provided with a cathode, demineralizing compartments compartmentalized with anion exchange membranes on the anode side and compartmentalized with cation exchange membranes on the cathode side, and concentrating compartments compartmentalized with cation exchange membranes on the anode side and compartmentalized with anion exchange membranes on the cathode side, the electrodialyzer having ion exchangers accommodated in the demineralizing compartments, and (ii) applying a voltage while supplying water to be treated to the demineralizing compartments to remove impurity ions in the water to be treated, wherein at least a part of the untreated water or already treated water is withdrawn to be added to a concentrating water for recycle, a flow amount of untreated water to be introduced into the demineralizing compartments being from 2 to 5.5 to a flow amount of a concentrating water to be introduced into the concentrating compartments, a linear velocity of untreated water in the demineralizing compartments being from 0.5 to 7.0 cm/sec, and a linear velocity of a concentrating water in the concentrating compartments being from 1.2 to 20 times to the linear velocity in the demineralizing compartments.

2. The method for producing deionized water according to claim 1, wherein the untreated water or treated water is withdrawn in an amount of from 0.2 to 9.5 wt % to be added to a concentrating water.

3. The method for producing deionized water according to claim 1, wherein the demineralizing compartments have a thickness of from 0.3 to 30 cm and the concentrating compartments have a thickness of from 0.01 to 3.7 cm.

4. The method for producing deionized water according to claim 1, wherein an acid or a salt is added to the concentrating water.

5. The method for producing deionized water according to claim 1, wherein the flow amount of the untreated water to be introduced into the demineralizing compartments is from 3 to 5 to the flow amount of the concentrating water to be introduced into the concentrating compartments.

6. The method for producing deionized water according to claim 1, wherein the linear velocity of the untreated water in the demineralizing compartments is from 1.0 to 5.5 cm/sec.

7. The method for producing deionized water according to claim 1, wherein the linear velocity of the concentrating water in the concentrating compartments is from 1.5 to 15 times to the linear velocity in the demineralizing compartments.

* * * * *